Patented May 12, 1942

2,283,115

UNITED STATES PATENT OFFICE 2,283,115

BREAKFAST CEREAL

Lawrence M. Yingling, Gibsonia, Pa.

No Drawing. Application January 11, 1940, Serial No. 313,439

3 Claims. (Cl. 99—83)

This invention relates to an improved cereal and more especially to a cereal which is tasty and is also provided with ingredients which are an aid to natural elimination.

An object of this invention is to provide a cereal which is formed with ground wheat body to which is added a ground fruit having a characteristic to aid in natural elimination, while at the same time providing a pleasing taste to the product.

Another object of this invention is to provide a cereal in the form of ground wheat which is passed over a screen to remove the dust, ground figs and a seasoning means, the mixture being of such a character that it will cook in five minutes.

In the preparation of this cereal, whole wheat is ground fairly fine after having been cleaned and scoured. The degree of fineness of the grinding is such that the material will readily cook thoroughly over a period of five minutes. The ground whole wheat containing bran and the wheat germ is then passed over a 60 mesh screen to remove the extra fine flour or dust. The screening process retains the bran, wheat germ and granular particles and removes the fine dusty flour which amounts to approximately 25% of the ground material. The removal of the flour dust, a poorly digestible portion of whole wheat, eliminates the formation of a paste when the cereal is poured into boiling water to cook and also permits a faster cooking of the ingredients due to being free from lumping. To about 75 pounds of screened wheat there are added 25 pounds of wheat farina to replace the dusty flour, 5 pounds of extra wheat germ, 4 pounds of medium salt known as pretzel salt, and 6 pounds of sugar known as "double A" crystal sugar. The ground screened wheat, farina, extra wheat germ, salt and sugar are than thoroughly mixed together.

To the above mixture, there are added 15 pounds of ground, dried and baked figs. The figs here used are of the type known as white figs, or Adriatic figs. The initially dried figs are cut into very small pieces in a vegetable cutter and the cut pieces are then scattered thinly on trays. The trays are placed in an oven and the pieces are baked for a period of about 30 minutes until they attain a dark brown color. The oven is maintained at a temperature of about 350° F. When the fig pieces are removed from the oven, they are in a sticky condition, and are then placed in a cool dry room having a temperature of about 65° F. The cooling of the figs in the drying room causes the pieces to crystallize and harden. The crystallized pieces are ground to a fairly fine degree with a cone burr grain grinder, and when the ground figs are not immediately mixed with the wheat, the figs are placed in air tight cans and stored in a cool room.

The ground figs are baked to a dark brown color and mixed with the screened wheat, farina and wheat germ. The dark brown color of the baked ground figs gives a golden brown color to the entire mixture when cooked, and in addition the ground figs add a pleasing taste to the mixture.

The combination of the bran, which is retained with the ground wheat, and the baked and ground figs, not only adds a pleasing taste to the product, but also provides a mild natural laxative effect so that the product will not only have food properties, but will also have intestinal regulation properties, as well as being a tasty cereal.

Heretofore, there have been wheat cereals embodying figs as an ingredient, but these, due to the manner in which the figs were employed, were not a desirable commercial product as being lacking in intestinal regulation and palatability due to embodying in the cereal the juice extracted from figs made by soaking figs in water, therefore being weak in quality and taste. They were also objectionable because they embodied that portion of the wheat which made the cereal pasty, and thus further lacking in readily digestible starch and palatability. This improved product has superior keeping qualities due to the manner of treating the figs so as to remove the moisture therefrom and also due to the removal of the finely ground flour. The removal of the fine flour and the addition of wheat germ over and above that normally present in the wheat also is an aid to the nutritional quality and palatability of the product.

The completed mixture is then put up in suitable packages and is ready for final cooking. The product will readily cook in a period of five minutes.

What I claim is:

1. The method of preparing a cereal which consists in grinding whole wheat, screening the wheat through a screen capable of retaining the bran, wheat germ and granules, mixing farina, additional wheat germ, salt and sugar with the screened wheat, cutting dried figs into small pieces, baking the cut figs for a period of about thirty minutes at a temperature of about 350° F. until the cut figs attain a dark brown color and are ready to crystallize, grinding the crystallized figs, and mixing the baked and ground figs with the screened ground wheat, farina, wheat germ, salt and sugar.

2. The method of preparing a cereal which includes the mixing together of ground screened whole wheat, wheat farina, wheat garm, salt, sugar, baking finely cut dried figs at a temperature of about 350° F. for a period of about thirty minutes when they attain a dark brown color, crystallizing the baked figs, grinding the crystallized figs, and mixing the ground crystallized baked figs with the wheat, farina, wheat germ, salt and sugar.

3. A method of producing a cereal breakfast food containing processed dried figs, ground screened whole wheat, wheat farina, wheat germ, sugar and salt, which includes cutting the dried figs into small pieces, baking the pieces for a period of about thirty minutes at a temperature of about three hundred and fifty degrees Fahrenheit, when they attain a dark brown color, crystallizing the baked figs at a temperature of about sixty-five degrees Fahrenheit, and grinding the crystallized figs.

LAWRENCE M. YINGLING.